Dec. 2, 1969   R. C. BREWER ET AL   3,481,361
LATCH ASSEMBLY FOR DIFFERENTIAL VALVE
Filed Nov. 4, 1966

INVENTOR
Russell C. Brewer
Joseph C. Bystricky
Lee T. Miller.

By Morton Lessey
Attorney

United States Patent Office 3,481,361
Patented Dec. 2, 1969

3,481,361
LATCH ASSEMBLY FOR DIFFERENTIAL VALVE
Russell C. Brewer, Chicago, Joseph C. Bystricky, Crystal Lake, and Lee T. Miller, Arlington Heights, Ill., assignors to Motorola, Inc., Franklin Park, Ill., a corporation of Illinois
Filed Nov. 4, 1966, Ser. No. 592,107
Int. Cl. F16k *31/44;* B60t *17/18*
U.S. Cl. 137—351                    3 Claims

ABSTRACT OF THE DISCLOSURE

The following specification describes a U-shaped latch for a differential valve used in a vehicle oil mist system. The latch has a loop in the back leg for engagement by a lever arm operated on movement of the vehicle in the event the operator neglects to release the latch. When the latch is engaged by the lever arm, it is released to open the valve. A magnet is used to assist the lever in releasing the latch and for thereafter holding the lever arm operated.

---

This invention relates in general to valve latching apparatus and more particularly to apparatus for latching and automatically unlatching a differential valve utilized in a vehicle oil mist lubrication system.

Truck oil mist lubrication systems employ compressed air from the same source supplying air for operating the truck brakes. The compressed air is transmitted through an oil mist reservoir assembly to mist oil for transmission to bearings or other apparatus requiring lubrication. When the brake systems are tested it is required that the available air pressure be at a certain value. In order to determine that the proper air pressure is available, a valve is employed for temporarily terminating the oil mist air supply. This valve may be of the type shown in application Ser. No. 388,505, filed Aug. 10, 1964, in that it automatically opens to pass air in response to the presence of a predetermined minimum air pressure.

The operator or driver is required to manually operate this differential valve which is often located outside the truck cab and on the truck trailer. In order to relieve the operator of the necessity of holding the valve closed manually, it is desired to employ a latch with which the operator can latch the valve in its closed position and then return to the cab or other duties. As sometimes happens, the operator may forget to unlatch the valve after the test is completed, so that when the truck is driven away lubrication will not be supplied to the bearings.

In order to avoid this problem the present invention proposes to utilize apparatus which, in addition to providing an improved latch for the valve, automatically functions to unlatch the valve in response to movement of the truck and thereby insure an air supply to the oil mist system and proper lubrication.

It is therefore a primary object of the present invention to provide apparatus for automatically unlatching a latched valve supplying air to a truck oil mist system.

It is another object of the present invention to provide improved latch apparatus for a valve supplying air to a truck oil mist system.

Still another object of the present invention is to provide an improved and more economical apparatus for latching and unlatching the differential valve of a truck oil mist system.

Other objects and features of this invention will become apparent upon examination of the following specification and claims together with the drawings, wherein:

Figure 1:
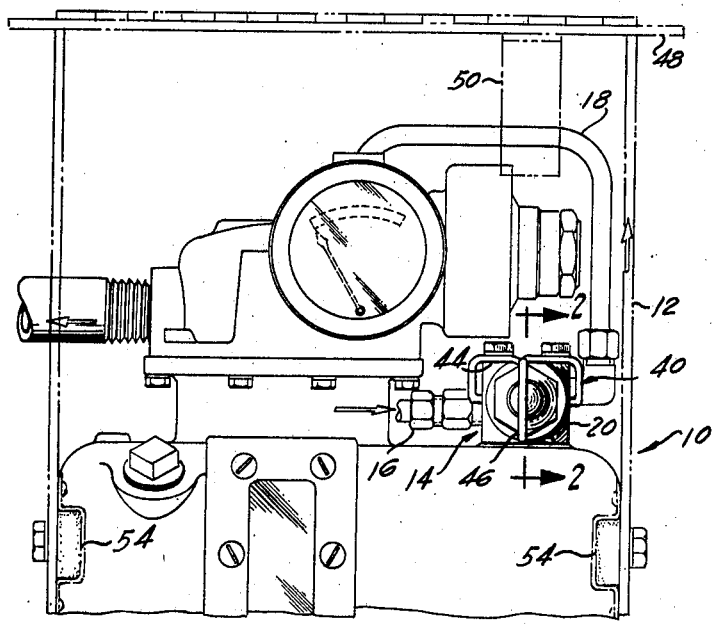
FIG. 1 is a front elevational view of a typical oil mist reservoir and differential valve assembly used in a truck oil mist system with a housing therefor indicated in broken lines.

In FIG. 1 of the drawings, an oil mist assembly is indicated by the reference character 10. The mist assembly 10 is supported within a housing 12 indicated by broken lines. A differential valve assembly 14 of the type described in the aforementioned application passes air received under pressure from the air compressor tank of the truck and a conduit 16 through a conduit 18 to the oil mist assembly 10, which in turn transmits an oil mist air stream to the various parts to be lubricated.

Figure 2:
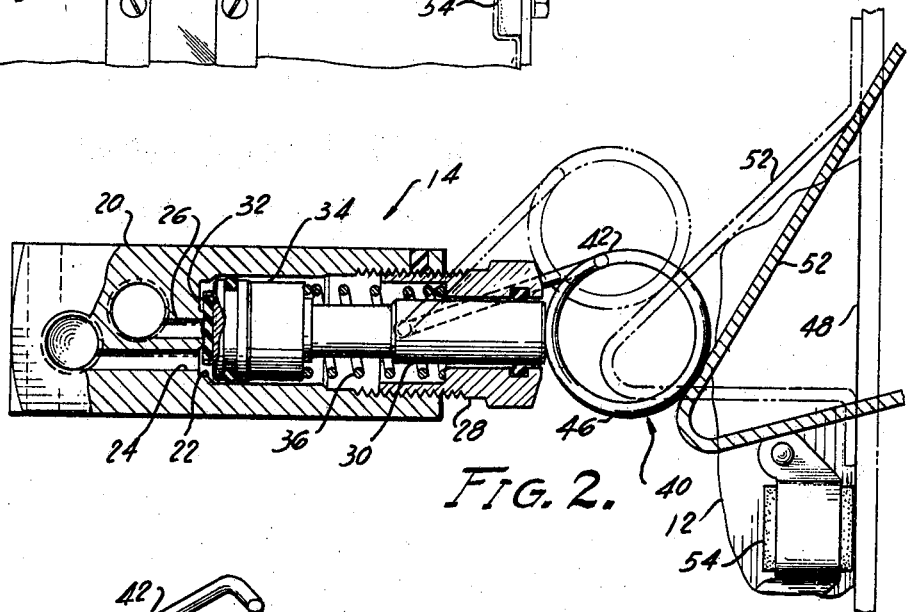
FIG. 2 is a sectional view illustrating the latch apparatus in latched position with the unlatched position indicated by broken lines.
Figure 3:
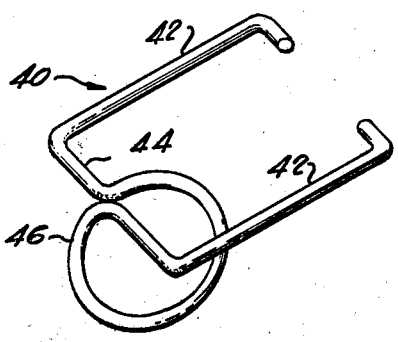
FIG. 3 is a perspective view of the latch.

As seen in FIG. 2 the valve 14 comprises a valve body 20 which is mounted on the oil mist reservoir assembly 10. The valve body 20 has a chamber 22 for communicating an inlet port 24 with an outlet port 26, both located at one end of the chamber. An adjustable threaded member 28, through which a manually operated sealed rod 30 extends, closes the other end of the chamber 22. The valve operating rod extends to a valve member 32 through a piston 34, which is biased in a valve closing direction by a spring 36.

The valve 32 and piston 34 are movable independently of each other, however, in response to a predetermined air pressure at the inlet port 24, the valve, rod and piston automatically move in one direction as described in the aforementioned application, for communicating air at the inlet port 24 through chamber 22 to the outlet port 26 to the oil mist reservoir. The valve 32 is operated alone by the driver pressing the rod 30 in the opposite direction prior to a brake test for closing port 24 independently of piston 34. The valve 32, therefore, requires comparatively little force to operate in the closing direction since only the small valve area is operated against the air pressure.

The valve 14 and reservoir assembly 10 are often located on the truck trailer. To avoid the necessity for the driver manually retaining the valve 32 in its closed position, a U-shaped spring latch 40 is provided. This latch frees te operator or driver to attend to other duties. The latch 40 may be formed of rod stock and comprises a pair of spaced side legs 42 having inwardly projecting pins on the ends thereof for insertion in respective apertures in the valve body 20 lying in a general plane close to the longitudinal axis of the rod 30 to provide a center of rotation lying adjacent that axis. The latch 40 is thus rotatably mounted on the valve body 20. The side legs 42 are joined by a back leg 44 in which a generally annular or circular configuration 46 defining an open ended loop is formed in the mid portion thereof to provide a finger hole portion with free or open ends.

The periphery of the open ended loop finger hole portion 46 rests on the back upper edge of operating rod 30 when valve 32 is in the open position, as shown by the broken lines in FIG. 2. As the finger portion 46 is rotated downwards by the driver for closing the valve, its periphery moves along an arc transverse to the rod axis for moving the valve 32 into the closed position until the portion of the periphery engaged with rod 30 is engaged against the back end of rod 30. The point of engagement lies on a line generally parallel to the rod axis. The latching member is thereafter retained in the valve latching position, since the force exerted by the air pressure against the rod 30 is directed primarily along a radius of the arc traversed by the latch. The operator can therefore leave to attend other duties while the valve remains closed. It will be appreciated, of course, that some clearance is provided in the movement of latch 40 so that it does not actually begin to close valve 32 until portion 46 may have moved through a ¼″ arc. This ensures that valve 32 will be in its open position when the latch is moved in the opposite or opening direction, since the fully open position of valve 32 will depend on manufacturing tolerances and adjustment of member 28. To open the valve 32 manually the driver of course simply rotates latch 40 upwardly to allow air pressure at inlet 24 to drive the valve 32 and rod 30 to the open position.

Mounted on the housing 12 is a swinging door 48 shown in its completely open position in FIG. 1. The door carries a triangular-shaped lever arm 50 having an inclined leg 52 at about 45° to the plane of the door. The leg 50 normally rests underneath the latch portion 46 at a position above the axis of rod 30 when the door 48 is in the closed position, as shown by the broken lines in FIG. 2. The lever arm 50 is rotated out of engagement with the latch when the door is opened preparatory to closing the valve 32, and after the valve is latched closed, the door is allowed to come to rest with the lever arm 50, as shown in FIG. 2, tengentially engaging the finger hole portion 46 below the axis of rod 30 and at a point lying on a line transverse to the radial line of the latch.

After the brake test is completed, the operator may manually open the latch by simply closing the door 48 to cause the lever arm 50 to rotate the latch 40 upwards. If the truck is driven without closing the door 48 or opening latch 40, vibration or starting and stopping procedures causes the door 48 to swing. As the door swings the leg 52 exerts a lifting force on the latch 40 along a line transverse to the axis of rod 30. This lifting force is of course dependent on the angle at which the lever arm engages the latch and the momentum of the door and latch which is so proportioned that with comparatively slight movement of the door the latch 40 is rotated upwards from a position generally parallel with the rod axis to allow the inlet pressure on valve 32 to move the rod and latch to their open position.

As the door swings, of course, it comes close to the sides of the housing 12 and to insure that it is retained closed, a pair of spaced permanent magnets 54 located along the housing sides attract the door to hold it closed. The magnets 54 are located so that their force on door 48 is exerted at some distance from the hinge and they provide additional momentum to the door for enabling the lever arm to open the latch.

With the door 48 in its closed position lever arm 50 rests beneath latch 40 and provides additional resistance to any inadvertent closing movement of the latch during operation of the vehicle.

It will be appreciated, of course, that door 48 may, if desired, be held latched open in a position similar to that shown in FIG. 1 by, for example, an appropriately placed magnet near the hinge. When released the door and lever arm will, of course, rotate with sufficient force to open latch 40. The release of the door from a latched position is accomplished either manually or by vibration incurred during vehicle movement.

The above description relates to an improved truck oil mist valve latch and apparatus whose inventive concepts are believed set forth more fully in the accompanying claims.

What is claimed is:

1. For use with a valve located within the periphery of a housing and automatically moved in one direction in response to a predetermined air pressure applied thereto for opening said valve to supply air to an oil mist reservoir system of a vehicle, the improvement comprising a rod in said housing movable solely along the longitudinal axis of said rod and extending from said valve for manually moving said valve in the opposite direction to close said valve, a rotatably mounted wire spring latch completely within the periphery of said housing manually rotatable downwardly along an arc having an axis of rotation adjacent the axis of said rod whereby said latch engages said rod to move said valve in said opposite direction to close said valve with said latch thereafter being held in one position within the periphery of said housing and preventing movement of said rod in said one direction on being engaged with said rod at a first point lying along a line generally parallel to the axis of said rod, a door for said housing mounted for downward rotation under the influence of gravity independently of said latch and in response to movement of said vehicle, and a lever arm carried by said door for engaging said latch within said housing periphery in response to the downward rotation of said door at a second point along a line transverse to said rod axis and said latch axis when said latch is engaged with said rod at said first point for moving said latch from said point to thereby enable said valve to open in response to the application thereto of said predetermined air pressure.

2. For use with a valve automatically moved in one direction in response to a predetermined air pressure applied thereto for opening said valve to supply air to an oil mist reservoir system of a vehicle with said valve having a rod extending therefrom manually movable along the rod axis in a horizontal plane for manually moving said valve in the opposite direction to close said valve, the improvement comprising a U-shaped wire latch having a back leg forming an open ended loop of substantially 360° and side legs having an axis of rotation in said plane perpendicular to said one axis and displaced from said back leg with the plane of said loop perpendicular to both axes and engaging said rod in response to rotation across said horizontal plane to move said valve in said opposite direction for closing said valve, said loop thereafter being held in engagement with said rod at a point lying along a line generally parallel to and adjacent the axis of said rod for preventing movement of said rod in said one direction, a lever arm, and means mounting said lever arm for rotation downwardly about an axis displaced above said rod axis under the influence of gravity in response to movement of said vehicle whereby said loop is engaged by said arm in response to rotation of said arm downwardly on movement of said vehicle to apply a force to said loop along a line transverse to said horizontal plane and displaced from said latch axis when said loop is engaged with said rod at said point for rotating said latch from engagement with said rod at said point to thereby enable said valve to open in response to the application thereto of said predetermined air pressure.

3. For use with a valve automatically moved in one direction in response to a predetermined air pressure applied thereto for opening said valve to supply air to an oil mist reservoir system of a vehicle with said valve having a rod extending therefrom for manually moving said valve in the opposite direction to close said valve, the improvement comprising a rotatably mounted U-shaped wire latch having a back leg forming an open ended loop of substantially 360° and having an axis of rotation passing through the side legs of said U-shaped latch and perpendicular to said rod axis with both axes lying in a horizontal plane perpendicular to the plane of said loop for engaging said back leg loop with said rod in response to rotation of said loop to move said valve in said opposite direction for closing said valve with said back leg loop thereafter being held in engagement with said rod at a point lying along a line generally parallel to the axis of said rod for preventing movement of said rod in said one direction, a lever arm, a housing encircling said valve and latch, a door for said housing carrying said lever arm and mounted on said housing for downward rotation under the influence of gravity in response to movement of said vehicle for engaging said lever arm with said back leg loop in response to rotation of said arm along a line transverse to said axis when said loop is engaged with said rod at said point for rotating said latch from engagement with said rod at said point to thereby enable said valve to open in response to the application thereto of said predetermined air pressure, and a magnet carried adjacent the edge of said housing at a position spaced a greater distance from the axis of rotation of said door than the distance between said door axis and said back leg loop axis with one pole of said magnet engaged with said door after said downward rotation whereby the force of attraction between said magnet and door is exerted through a substantial moment arm and said lever arm is thereafter retained in one position holding said loop spaced from said point.

References Cited

UNITED STATES PATENTS

| | | | |
|---|---|---|---|
| 912,274 | 2/1909 | Bastian | 251—263 X |
| 1,685,286 | 9/1928 | Larson | 251—263 X |
| 2,942,622 | 6/1960 | Hahn et al. | 251—263 X |
| 3,167,931 | 2/1965 | Bryson | 312—236 X |

WALTER A. SCHEEL, Primary Examiner

J. P. McINTOSH, Assistant Examiner

U.S. Cl. X.R.

251—263

UNITED STATES PATENT OFFICE
CERTIFICATE OF CORRECTION

Patent No. 3,481,361 December 2, 1969

Russell C. Brewer et al.

It is certified that error appears in the above identified patent and that said Letters Patent are hereby corrected as shown below:

In the heading to the printed specification, lines 5 and 6, "Motorola, Inc., Franklin Park, Ill., a corporation of Illinois" should read -- Stewart-Warner Corporation, Chicago, Ill., a corporation of Virginia --.

Signed and sealed this 17th day of November 1970.

(SEAL)
Attest:

Edward M. Fletcher, Jr.  
Attesting Officer

WILLIAM E. SCHUYLER, JR.  
Commissioner of Patents